United States Patent [19]

Koster et al.

[11] Patent Number: 5,037,359
[45] Date of Patent: Aug. 6, 1991

[54] TRANSMISSION SYSTEM, MOTOR DRIVE COMPRISING SUCH A TRANSMISSION SYSTEM AND WHEEL AND BELT FOR SUCH A TRANSMISSION SYSTEM OR MOTOR DRIVE

[75] Inventors: Marinus P. Koster, Eindhoven, Netherlands; Justinus T. A. C. Paquay, Chamalières, France; Hermanus M. J. R. Soemers, Eindhoven, Netherlands

[73] Assignee: U.S. Philips Corporation, New York, N.Y.

[21] Appl. No.: 542,463

[22] Filed: Jun. 22, 1990

[30] Foreign Application Priority Data

Jun. 30, 1989 [NL] Netherlands ................. 8901662

[51] Int. Cl.⁵ ............................................ F16G 1/00
[52] U.S. Cl. ................................... 474/148; 474/184
[58] Field of Search ............ 474/148, 152, 153, 95–99, 474/184, 249

[56] References Cited

U.S. PATENT DOCUMENTS 3,719,098  3/1973  Graves ..................... 474/184 X
3,851,536 12/1974  Zeldman .................... 474/148

OTHER PUBLICATIONS

Handbook—"Taschenbuch fur den Maschinenbau", Dubbel, 1986, pp. 437–438, H. W. Miller.

Primary Examiner—Thuy M. Bui
Attorney, Agent, or Firm—William Squire

[57] ABSTRACT

A transmission system comprising at least two wheels and a belt wound around the wheels with an unambiguous transmission ratio in that the transmission system is free from clearance and is comparatively stiff, while geometric errors, such as the polygon effect, and manufacturing errors and the occurrence of slip are neutralized in that the wheels are subdivided into segments, which can separately perform a tangential displacement. The belt has spaced opening for receiving the segments, which tangentially displace in case of misalignment of the segments to the belt openings. The belt has spaced opening for receiving the segments, which tangentially displace in case of misalignment of the segments to the belt openings.

17 Claims, 4 Drawing Sheets

TRANSMISSION SYSTEM, MOTOR DRIVE COMPRISING SUCH A TRANSMISSION SYSTEM AND WHEEL AND BELT FOR SUCH A TRANSMISSION SYSTEM OR MOTOR DRIVE

BACKGROUND OF THE INVENTION

Field of the Invention

The invention relates to a transmission system comprising two wheels and an endless belt wound around the wheels. The invention further relates to a motor drive comprising such a transmission system and to a belt and a wheel for such a transmission system or motor drive.

Description of the Prior Art

A transmission system of the kind to which the present invention relates is known inter alia from the handbook "Taschenbuch for den Maschinenbau", Dubbel, 1986, pp. 437 and 438, in various embodiments. Such a transmission system serves for the transmission of mechanical power between two or more wheels with parallel axes of rotation by means of an endless belt wound around the wheels. The various embodiments can be subdivided into two main groups.

Firstly, there are form-locking transmission systems. These are transmission systems which transmit power in that elements of the belt and a wheel are in engagement with each other. Instead of the expression "form-locking transmission systems", the expression "positive transmission system" is also used in the relevant literature. An example of a form-locking transmission system is a toothed belt transmission system, in which the teeth of a toothed belt and of a toothed wheel are in engagement with each other, as a result of which power is transmitted. Disadvantages of form-locking transmission systems are the occurrence of clearance, a comparatively limited stiffness and a non-uniform running due to the so-called polygon effect. Most of the form-locking transmission systems can otherwise be made free of clearance, however, though at a comparatively high cost price. However, the two remaining disadvantages still subsist.

Secondly, there are the friction-locking or force-locking transmission systems. These are transmission systems which transmit power in that in operation friction occurs between parts of the belt and the wheel. An example is a steel belt transmission system comprising an endless steel belt, which is wound with pre-stress around the wheels. In this case, the power is transmitted by friction between the belt and a wheel. This steel belt transmission system has a comparatively high stiffness and does not exhibit a polygon effect. However, due to the fact that the belt slips over the wheels, after a number of revolutions of a wheel the number of revolutions of another wheel in the transmission system cannot be defined unambiguously. The transmission ratio of a friction-locking transmission system is thus not unambiguously known.

SUMMARY OF THE INVENTION

The invention has for its object to provide a transmission system of the kind described in the opening paragraph, in which an unambiguous transmission ratio is defined whilst maintaining a sufficient mechanical stiffness. In a transmission system according to the invention, this object is achieved in that each wheel is subdivided into segments which are displaceable against spring force in the tangential direction of the wheel, a segment being provided with a running surface having a radially directed projection, while the belt has recesses through which, when the transmission system is operative, the projections are in engagement with the belt, which transmits power from one wheel to the other wheel mainly by friction with running surfaces.

Tolerance errors in the pitch distance between projections of a wheel or recesses in the belt and differences in deformations between belt and wheel are neutralized in additional deformation of the wheel by tangential displacement of a segment of the wheel. The transmission ratio is determined by the ratio between the number of projections and the number of segments of the wheels and is therefore defined unambiguously. The stiffness of the transmission system is at the same level as that of form-locking transmission systems and is only slightly lower as compared with that of force-locking transmission systems.

A particular embodiment of the transmission system according to the invention is characterized in that a segment is partly limited by radially directed surfaces of the wheel and adjoining walls of axially directed cylindrical holes in the wheel, each segment being displaceable in the tangential direction of the wheel by means of an elastically deformable bridge between two cylindrical holes in the wheel with a force exerted on the relevant segment.

A wheel having such segments can be manufactured in a comparatively simple manner and with a high accuracy. Although a single segment only has a limited stiffness in the tangential direction of the wheel and will be deformed with a force exerted on the segment, the overall tangential stiffness of the wheel is determined by the sum of the tangential stiffnesses of the separate segments and is comparatively high.

Another embodiment of the transmission system according to the invention is characterized in that a segment is partly limited by radially directed surfaces of the wheel and each segment is partly twisted between said surfaces about a radially directed shaft, each segment being displaceable in the tangential direction of the wheel with a force exerted on the relevant segment. Due to the fact that a segment is partly twisted, the stiffness with respect to a non-twisted segment in the tangential direction of the wheel is reduced. The overall tangential stiffness of the wheel is again determined by the sum of the tangential stiffnesses of the separate segments.

A further embodiment of the transmission system according to the invention is characterized in that a wheel comprises more circular disks subdivided into sectors, a sector being partly limited by radially directed coinciding surfaces of the disks and sectors of different disks joined together to form a segment, while sectors of the different disks are joined to form a segment are displaceable in a plane directed tangentially with respect to the disks with a force exerted on the relevant segment.

The disks can be mass-produced in a simple manner, for example from sheet material by means of stamping.

A still further embodiment of the transmission system according to the invention is characterized in that a segment is provided with a projection having an evolvent shape. The evolvent shape guarantees that the belt is uniformly wound onto and unwound from a wheel. In order to improve winding and unwinding of the belt still further, according to a further embodiment of the transmission system the belt is provided with recesses limited by stamped vanes, the vanes being directed towards each other, viewed in a direction of engagement of the projections. When the belt is wound onto a wheel, the transmission of a part of the power does not yet take place by means of friction. In fact, the belt does not yet engage the surface of the segment. The transmission of power takes place by means of the contact between the projection of the segment and walls of the recess in the belt. A surface pressure then occurs on the walls of the recesses and on the projection. The vanes reduce this surface pressure by enlargement of the contact surface with elastic deformation.

As stated, the invention further relates to a motor drive comprising one of the transmission systems described. The motor drive comprises a motor, an angle sensor coupled to a motor shaft, a transmission system according to one of the preceding embodiments driven by the motor shaft and a control unit, the control unit comparing a position of the motor shaft measured by the angle sensor with the desired position of the motor shaft and then controlling the motor in order to correct for differences between the measured position and the desired position.

By means of such a motor drive, it is possible to obtain accurate displacements of a load without using a position sensor coupled to the load because the position of an outgoing shaft of the transmission is defined unambiguously by the position of the motor shaft. The unambiguous transmission ratio is due to a considerable extent to the absence of slip and with accurate displacements also to the absence of the polygon effect so that use of electric motors becomes possible which have an angle sensor integrated in the motor, whose output signal is supplied to a control unit.

IN THE DRAWINGS

The invention will be described more fully with reference to the drawing, in which:

FIG. 1 shows diagrammatically in side elevation a transmission system according to the invention, FIG. 2 shows diagrammatically in side elevation a first embodiment of two segments of a wheel, as can be used in a transmission system of the kind shown in FIG. 1, FIG. 3 is a sectional view taken on the line III—III in FIG. 2, FIG. 4 shows diagrammatically in side elevation a second embodiment of two segments of a wheel, as can be used in a transmission system of the kind shown in FIG. 1, FIG. 5 is a sectional view taken on the line V—V in FIG. 4, FIG. 6 shows diagrammatically in side elevation a third embodiment of two segments of a wheel, as can be used in a transmission system of the kind shown in FIG. 1, Fig. 7 is a sectional view taken on the line VII—VII in FIG. 6, FIG. 8 shows diagrammatically in plan view a belt that can be used in a transmission system of the kind shown in FIG. 1, FIG. 9 is a sectional view taken on the line IX—IX in FIG. 8, FIG. 10 shows diagrammatically a motor drive having a transmission system of the kind shown in FIG. 1.

DESCRIPTION OF THE PREFERRED EMBODIMENT

Figure 1:
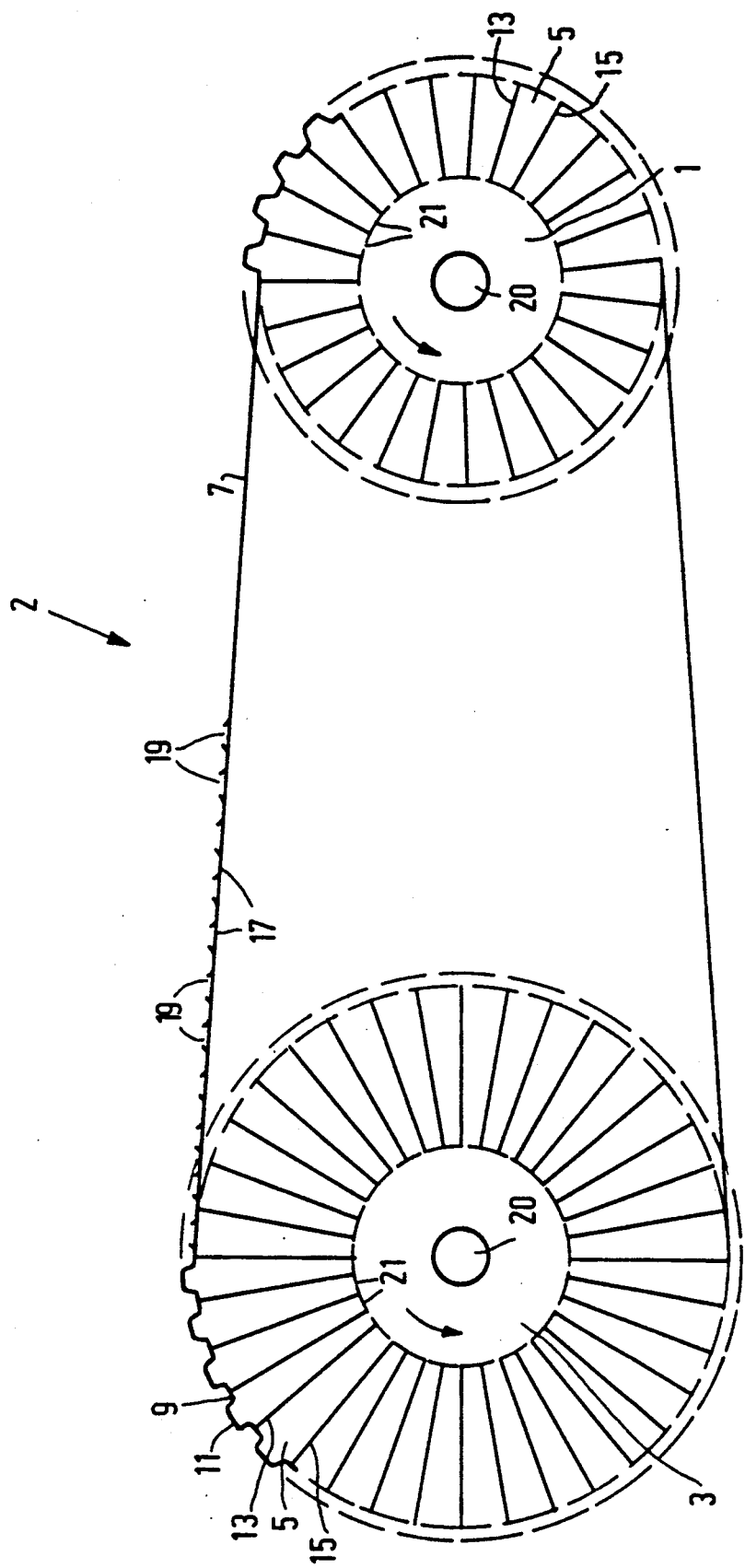

The transmission system 2 shown in FIG. 1 comprises two metal wheels 1, 3 and one endless metal belt 7 wound around the wheels subdivided into segments 5. Each segment 5 has a running surface 9 having a radially directed projection 11 in an evolvent shape. A segment 5 is partly limited by radially directed surfaces 13, 15 of the wheels 1, 3 and is displaceable in the tangential direction of the wheel with a force exerted on the relevant segment. The belt 7 is provided with recesses 17, which are limited by stamped vanes 19, with which the projections 11 are in engagement. The vanes are directed towards each other, viewed in a direction of engagement of the projections 11. The wheels 1, 3 are arranged during operation at such a relative distance that the belt 7 is wound with pre-stress around the wheels. The pitch distance between two successive recesses 17 in the belt 7 during operation is equal to the pitch distance between two successive projections 11 of a wheel 1, 3. In the transmission described, power is transmitted from a small wheel 1 to a large wheel 3 mainly by friction between the belt 7 and the running surfaces 9 of the segments 5. This friction between the belt 7 and the running surfaces 9 of the segments 5 of the large wheel 3 results not only in an angular rotation of the wheel 5 about a rotary shaft 20, but also in a local tilting of the segments 5 in the wheel 3 about tilting shafts 21 parallel to the rotary shaft 19. The tilting shafts 21 are constituted by elastically deformable bridges 33 (see FIG. 2) between successive segments 5. The tilting movement about the shafts 21 due to the power transmission can be changed for two reasons so that the overall tilting movement is then composed of three components to be discussed further. The first reason is that due to the tensile stresses in the belt 7 the pitch distance in operation between two recesses 17 is locally larger than the nominal desired pitch distance out of operation. By tilting the segments, this local tempory pitch difference can be neutralized. This means that to a first component due to the power transmission a second component due to the tensile stress is added to the tilting movement. The second reason is that out of operation the pitch distance between two projections 11 of a wheel 1, 3 and/or the pitch distance between two recesses 17 of the belt 7 deviate or deviate to a different extent from the nominal pitch distance due to manufacturing errors. By tilting the segments 5 about the shaft 21, the last-mentioned pitch errors can also be neutralized. This results in that the overall tilting movement has a further third component, i.e. that due to manufacturing errors. When the belt is wound onto and unwound from a segment of a wheel, power is already transmitted by this segment due to the form-locking connection between the vanes of the belt and the recesses of the segment before the power transmission by friction between the belt and the running surface of the relevant segment reaches its maximum value. This favours a power transmission free from shocks and vibrations. Tilting of wheel segments 5 with differences in pitch distance between two projections and two corresponding recesses prevents unnecessary loading of the segments. An unnecessary loading of the segments by a pre-stress in the belt deviating from a calculated optimal pre-stress is also prevented by tilting of the segments. It should be noted that the maximum stiffness of the transmission system is attained when deviations with respect to the desired pre-stress and the desired pitch distances are minimal. A comparatively high stiffness is of importance when the transmission system is used in a drive which, from a control viewpoint, must have a comparatively large band width. Due to the fact that in the transmission system described a tilting of the segments about the tilting shafts 21 ensures that the power transmission always mainly takes place by static friction between the belt and the running surfaces of the wheel segments, position loss by slip between belt and wheels will be considerably limited, especially upon reversal of movement.

Figure 2:
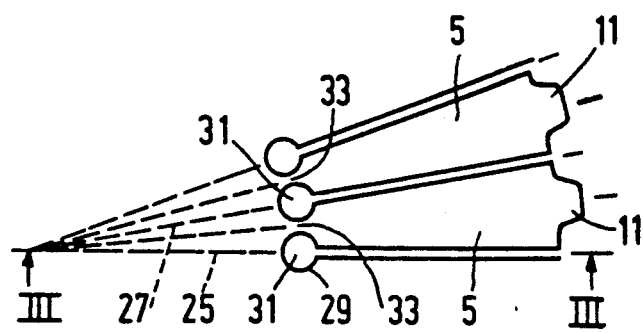
Figure 3:
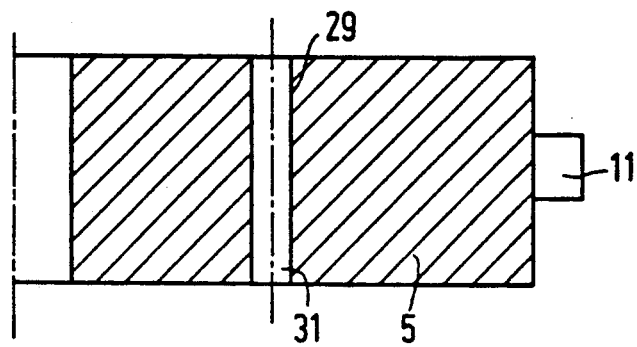

In the first embodiment of the transmission system shown in FIGS. 2 and 3, a segment is limited by two radially directed surfaces 25, 27 of the wheel and adjoining walls 29 of axially directed holes 31 in the wheel. An elastically deformable bridge 33 is present between two successive cylindrical holes 31, as a result of which a segment 5 is displaceable in the tangential direction of the wheel with a force exerted on the relevant segment.

Figure 4:
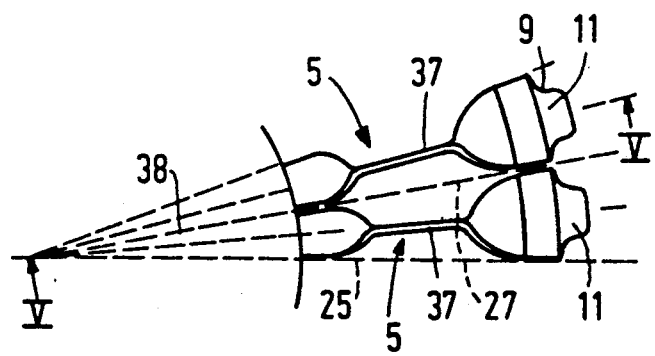
Figure 5:
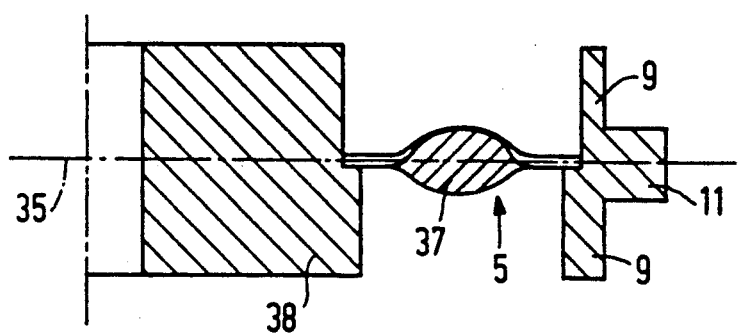

FIGS. 4 and 5 show a second embodiment of a segment of a wheel of the transmission system according to the invention, in which as far as possible reference numerals are used corresponding to FIGS. 1, 2 and 3. Each segment 5 has a strip twisted between the two radially directed surfaces 25, 27 about a radially directed axis 35. As a result, a twisted part 37 in the form of a blade spring is obtained so that a segment 5 is displaceable with elastic deformation of the twisted part 37 in the tangential direction of the wheel. The twisted parts 37 may be welded to the running surface 9 and a core 38 of the relevant wheel.

Figure 6:
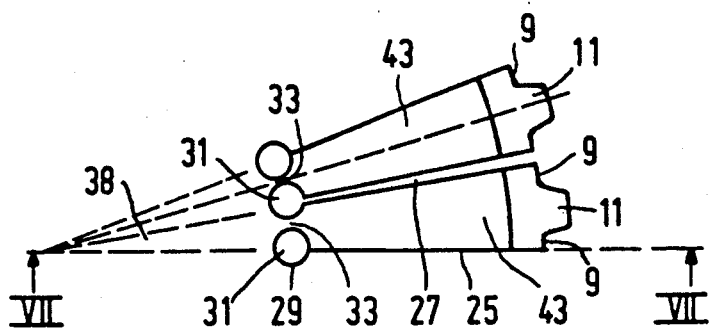
Figure 7:
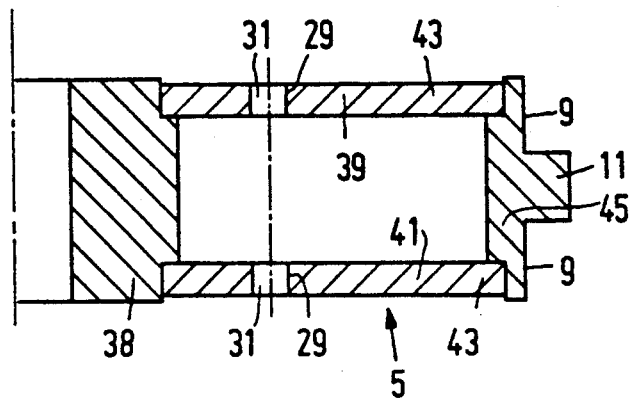

In the third embodiment of the transmission system according to the invention shown in FIGS. 6 and 7, each wheel has two circular disks 39 and 41 of, for example, metal subdivided into sectors. A sector is partly limited by the radially directed surfaces 25, 27 of a wheel and the adjoining walls 29 of axially directed cylindrical holes 31 in the wheel. Sectors 43 of different disks 39, 41 are joined to form a segment 5 by means of a metal bridge 45 having a running surface 9 and a projection 11 and thus have a common running surface. The sectors 43 of the disks 39, 41 of a segment 5 are limited by the same radially directed surfaces 25, 27 of the wheel and walls 29 of identical axially directed cylindrical holes 31 of the two sectors. A segment can perform a movement in a plane directed tangentially with respect to the disks by means of the elastically deformable bridges 33 of the two disks 39 and 41. The disks 39 and 41 may be welded to the bridge 45 and the core 38.

Figure 8:
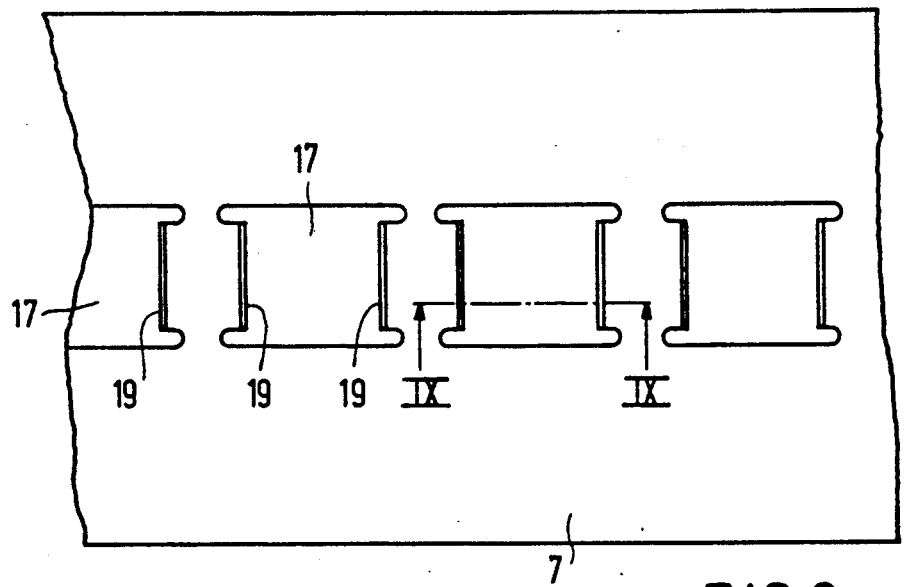
Figure 9:
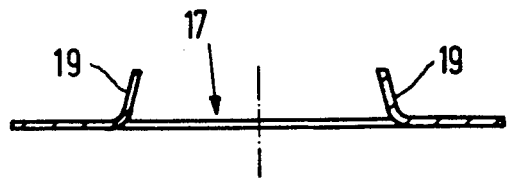

FIGS. 8 and 9 show a part of the belt 7. This belt is made of a metal strip, in which the recesses 17 are formed by stamping and subsequent bending of the vanes 19.

Figure 10:
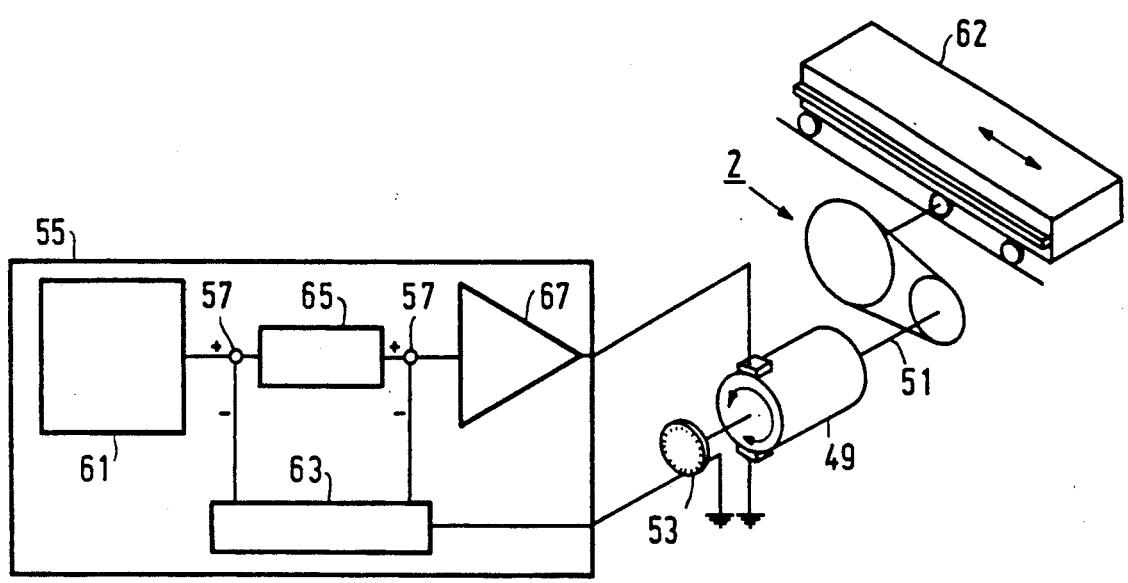

The motor drive according to the invention shown in FIG. 10 comprises an electric motor 49, an angular sensor 53 coupled to the motor shaft 51, a transmission system 2 according to the invention and a control unit 55.

In the control unit 55, the position measured by the angle sensor and the speed of the motor shaft 51 derived therefrom are compared with a desired position and a desired speed in comparators 57 and 59, respectively. A path generator 61 supplies a digital signal, which is related to the desired path to be covered of a load 62, to a comparator 57. In the comparator 57, the signal supplied by the path generator 61 is compared with a position signal of the angular sensor 53 processed by a processor 63. The difference signal of the comparator 57 is supplied to a regulator 65, such a, for example, a PI or PID regulator, whose output signal is amplified in an amplifier 67 and is supplied in amplified form to the electric motor 49. The processor 63 processes the output signal of the angular sensor 53 also as a speed signal, which is supplied to a further comparator 59. Due to the unambiguous transmission ratio between the motor shaft and the outgoing shaft of the transmission system, there is a linear relation between the position indicated by the angle sensor 53 and the position of the load 62. Since the angle sensor is coupled to the motor shaft, the motor unit is more stable, from a control viewpoint, than if the angle sensor should be coupled to the outgoing shaft of the transmission system. The speed at which a new desired position of the load can be attained is high due to the high stability.

In such a motor drive, inexpensive angle sensors integrated in the electric motor can be advantageously used.

When transmitting high powers, it is possible to use several transmission systems arranged in parallel. Several wheels with parallel shafts may also be driven simultaneously by means of one or more transmission systems according to the invention. The wheels may be made entirely or in part of metal and/or synthetic material. The use of the transmission system according to the invention is otherwise not limited to embodiments in which use is made of angle sensors which are integrated in the motor. In the case in which a position sensor is coupled to the load, the transmission system may be used in drives in which such a comparatively expensive sensor is not objectionable. In this manner, the production can be scaled up, which leads to a considerable saving in the overall cost of the transmission system.

We claim:
1. A transmission system comprising:
    a first wheel;
    a second wheel; and
    an endless belt wound about the wheels for driving one wheel in response to the rotation of the other wheel;
    each wheel being subdivided into a plurality of radially extending segments, each segment being secured for resilient tangential displacement relative to an adjoining segment, each segment having an outer peripheral running surface from which a radially directed projection extends, said belt having a plurality of recesses dimensioned to engage said projections, said running surface being dimensioned relative to said projection such that power is primarily transmitted to and from the belt by friction with the running surfaces.

2. A transmission system as claimed in claim 1, characterized in that each segment is partly limited by radially directed surfaces of the wheel and adjoining walls of axially directed cylindrical holes in the wheel, each segment being displaceable in the tangential direction of the wheel by means of an elastically deformable bridge between two cylindrical holes in the wheel with a tangential force exerted on the relevant segment.

3. A transmission system as claimed in claim 2, characterized in that the belt is provided with recesses limited by corresponding stamped vanes, the vanes corresponding to a recess being directed toward each other.

4. The system of claim 2 including a motor drive comprising a motor having a shaft, said motor for driving one of said wheels, an angle sensor coupled to the motor shaft, and a control unit, the control unit comparing a position of the motor shaft measured by the angle sensor with a desired position of the motor shaft and then controlling the motor to correct differences between the measured position and the desired position.

5. A transmission system as claimed in claim 1 characterized in that each segment is partly limited by radially directed surfaces of the wheel and each segment is partly twisted between said surfaces about a radially directed axis each segment being displaceable in the tangential direction of the wheel with a force exerted on that segment.

6. A transmission system as claimed in claim 5, characterized in that the belt is provided with recesses limited by corresponding stamped vanes, the vanes corresponding to a recess being directed toward each other.

7. The system of claim 5 including a motor drive comprising a motor having a shaft, said motor for driving one of said wheels, an angle sensor coupled to the motor shaft, and a control unit, the control unit comparing a position of the motor shaft measured by the angle sensor with a desired position of the motor shaft and then controlling the motor to correct differences between the measured position and the desired position.

8. A transmission system as claimed in claim 1, characterized in that a wheel comprises a plurality of circular disks subdivided into sectors, a sector being partly limited by radially directed juxtaposed surfaces of the disks and axially aligned sectors of different disk's are joined together to form a segment, the sectors of the different disks joined to form a segment are displaceable in a plane directed tangentially with respect to the disks with a tangential force exerted on that segment.

9. A transmission system as claimed in claim 8, characterized in that the belt is provided with recesses limited by corresponding stamped vanes, the vanes corresponding to a recess being directed toward each other.

10. The system of claim 8 including a motor drive comprising a motor having a shaft, said motor for driving one of said wheels, an angle sensor coupled to the motor shaft, and a control unit, the control unit comparing a position of the motor shaft measured by the angle sensor with a desired position of the motor shaft and then controlling the motor to correct differences between the measured position and the desired position.

11. A transmission system as claimed in claim 1, characterized in that a segment is provided with a projection having an evolvent shape.

12. A transmission system as claimed in claim 11, characterized in that the belt is provided with recesses limited by corresponding stamped vanes, the vanes corresponding to a recess being directed toward each other.

13. The system of claim 11 including a motor drive comprising a motor having a shaft, said motor for driving one of said wheels, an angle sensor coupled to the motor shaft, and a control unit, the control unit comparing a position of the motor shaft measured by the angle sensor with a desired position of the motor shaft and then controlling the motor to correct differences between the measured position and the desired position.

14. A transmission system as claimed in claim 1 characterized in that the belt is provided with recesses limited by corresponding stamped vanes, the vanes corresponding to a recess being directed towards each other.

15. The system of claim 14 including a motor drive comprising a motor having a shaft, said motor for driving one of said wheels, an angle sensor coupled to the motor shaft, and a control unit, the control unit comparing a position of the motor shaft measured by the angle sensor with a desired position of the motor shaft and then controlling the motor to correct differences between the measured position and the desired position.

16. The system of claim 1 including a motor drive comprising a motor having a shaft, said motor for driving one of said wheels, and angle sensor coupled to the motor shaft, and a control unit, the control unit comparing a position of the motor shaft measured by the angle sensor with a desired position of the motor shaft and then controlling the motor to correct differences between the measured position and the desired position.

17. A wheel for a transmission system having a pair of wheels and an endless belt wound about the wheels for driving one wheel in response to the rotation of the other wheel, said belt having a plurality of recesses, said wheel comprising:
   a plurality of radially extending segment; and
   means for securing each segment for resilient tangential displacement relative to an adjoining segment, each segment having an outer peripheral running surface from which a radially directed projection extends, said projection for engagement with a belt recess and dimensioned such that power is primarily transmitted to and from the belt by friction with the running surfaces.

* * * * *